US008557417B2

(12) United States Patent
Ahn

(10) Patent No.: US 8,557,417 B2
(45) Date of Patent: Oct. 15, 2013

(54) SECONDARY BATTERY

(75) Inventor: Changbum Ahn, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 424 days.

(21) Appl. No.: 12/796,551

(22) Filed: Jun. 8, 2010

(65) Prior Publication Data

US 2011/0135998 A1    Jun. 9, 2011

Related U.S. Application Data

(60) Provisional application No. 61/267,383, filed on Dec. 7, 2009.

(51) Int. Cl.
H01M 4/02 (2006.01)

(52) U.S. Cl.
USPC .............................. 429/60; 429/136; 429/162

(58) Field of Classification Search
USPC ............................ 429/60, 139, 161, 162, 209
See application file for complete search history.

(56) References Cited

U.S. PATENT DOCUMENTS

| 5,580,676 | A * | 12/1996 | Honda et al. ............ 429/139 X |
| 6,946,218 | B2 * | 9/2005 | Crouch, Jr. et al. ....... 429/162 X |
| 2006/0051662 | A1 | 3/2006 | Kwak et al. |
| 2006/0257736 | A1 | 11/2006 | Watanabe et al. |
| 2008/0020279 | A1 * | 1/2008 | Schmidt et al. ............. 429/221 |
| 2008/0241672 | A1 | 10/2008 | Utsumi et al. |

FOREIGN PATENT DOCUMENTS

| CN | 1806352 A | 7/2006 |
| EP | 1 641 057 A2 | 3/2006 |
| JP | 11-260418 | 9/1999 |
| JP | 2003-346798 | 12/2003 |
| JP | 2006-236994 | 9/2006 |
| JP | 2007-087652 | 4/2007 |
| JP | 2008-128106 | 6/2008 |
| JP | 2008-226555 | 9/2008 |
| JP | 2008-251226 | 10/2008 |
| KR | 10-2001-0010415 | 2/2001 |
| KR | 10-2002-0021757 | 3/2002 |
| KR | 10-2008-0099890 | 11/2008 |
| WO | WO 2004/114440 A2 | 12/2004 |
| WO | WO 2006/042416 A1 | 4/2006 |

OTHER PUBLICATIONS

Extended European Search Report dated Feb. 23, 2011 in corresponding European Patent application No. 10192428.0, 7 pps.
KIPO Office action dated Sep. 24, 2012, for corresponding Korean Patent application 10-2010-0118654, (5 pages).

(Continued)

*Primary Examiner* — Stephen J. Kalafut
(74) *Attorney, Agent, or Firm* — Christie, Parker & Hale, LLP

(57) ABSTRACT

A secondary battery includes a case comprising a body having a cavity and a cover sealed to the body; and an electrode assembly in the cavity, the electrode assembly including a first electrode plate having a coated portion coated with a first active material and an uncoated portion not coated with the first active material; a second electrode plate having a coated portion coated with a second active material; and a separator between the first electrode plate and the second electrode plate, wherein the first electrode plate, the second electrode plate and the separator are stacked together, and wherein the first electrode plate and the second electrode plate have substantially the same surface area.

13 Claims, 4 Drawing Sheets

(56) References Cited

OTHER PUBLICATIONS

Patent Abstracts of Japan, and English machine translation of Japanese Publication 2006-236994 listed above, (15 pages), (doc date Jul. 2006).
European Office action dated Nov. 22, 2012 for corresponding European Patent application 10192428.0, (6 pages).
Japanese Office action dated Feb. 26, 2013, for corresponding Japanese Patent application 2010-271551, (2 pages).
Patent Abstracts of Japan, and English machine translation of Japanese Publication 11-260418 listed above, (9 pages).
Patent Abstracts of Japan, and English machine translation of Japanese Publication 2003-346798 listed above, (20 pages).
Patent Abstracts of Japan, and English machine translation of Japanese Publication 2007-087652 listed above, (32 pages).
Patent Abstracts of Japan, and English machine translation of Japanese Publication 2008-128106 listed above, (15 pages).
Patent Abstracts of Japan, and English machine translation of Japanese Publication 2008-226555 listed above, (15 pages).

* cited by examiner

SECONDARY BATTERY

CROSS-REFERENCE TO RELATED APPLICATIONS

This application claims the benefit of U.S. Provisional Application No. 61/267,383, filed on Dec. 7, 2009, in the United States Patent and Trademark Office, the disclosure of which is incorporated herein in its entirety by reference.

BACKGROUND

1. Field

The present invention relates to a secondary battery.

2. Description of the Related Art

Recently, the use of portable electronic devices has increased with the rapid development of the communication and computer industries. Rechargeable secondary batteries are widely used as power sources of portable electronic devices. A secondary battery is generally formed by accommodating an electrode assembly including a positive electrode plate, a negative electrode plate, and a separator disposed between the positive electrode plate and the negative electrode plate in an outer case together with an electrolyte.

When the electrode assembly is accommodated in the outer case, it is desirable to accurately align the positive and negative electrode plates. In the conventional electrode assembly, however, since the positive and negative electrode plates have different sizes, it is not easy to properly align the positive and negative electrode plates.

SUMMARY

According to aspects of the present invention, a secondary battery is provided wherein a positive electrode plate and a negative electrode plate can be easily aligned.

One embodiment of the present invention provides a secondary battery 1000 including a case 100 comprising a body 110 having a cavity 112 and a cover 120 sealed to the body 110; and an electrode assembly 200 in the cavity 112, the electrode assembly 200 including a first electrode plate 210 having a coated portion 212 coated with a first active material and an uncoated portion 216 not coated with the first active material; a second electrode plate 220 having a coated portion 222 coated with a second active material; and a separator 230 between the first electrode plate 210 and the second electrode plate 220, wherein the first electrode plate 210, the second electrode plate 220 and the separator 230 are stacked together, and wherein the first electrode plate 210 and the second electrode plate 220 have substantially the same surface area.

In one embodiment, the uncoated portion 216 is located generally along at least one edge 217a, 217b, 217c, 217d of the first electrode plate 210. In embodiments, the uncoated portion 216 is located along the first edge 217a and along a second edge 217b of the at least one edge of the first electrode plate.

The secondary battery of claim 3, wherein the uncoated portion 216 is located along a third edge 217c and a fourth edge 217d of the at least one edge that extend in a direction substantially perpendicular to the first edge 217a.

Additionally, the first electrode plate 210 may have a first electrode tab 218 extending from a first edge 217a of the at least one edge and the second electrode plate 220 may have a second electrode tab 228 extending from an edge 227.

In one embodiment, a length of any of the third edge and the fourth edge is less than a length of the first edge.

In one embodiment, the separator 230 may have a larger surface area than any of a surface area of the first electrode plate 210 and a surface area of the second electrode plate 220. Additionally, the separator 230 may include a first sheet and a second sheet fused together to enclose the second electrode plate 220.

In one embodiment, the electrode assembly further comprises a plurality of first electrode plates, a plurality of second electrode plates and a plurality of separators, one of the separators being between a respective one of the first electrode plates and a respective one of the second electrode plates. Additionally, the first electrode tabs 218 are electrically connected to a first electrode lead 242 and the second electrode tabs 228 are electrically connected to a second electrode lead 244. In one embodiment, the first electrode plates, the second electrode plates and the separators are stacked together.

REFERENCE NUMERALS FOR SELECTED ELEMENTS

| | |
|---|---|
| 100: Outer case | 200: Example Assembly |
| 210: First Electrode Plate | 220: Second Electrode Plate |

Detailed Description

Exemplary embodiments will now be described more fully hereinafter with reference to the accompanying drawings.

Figure 1:
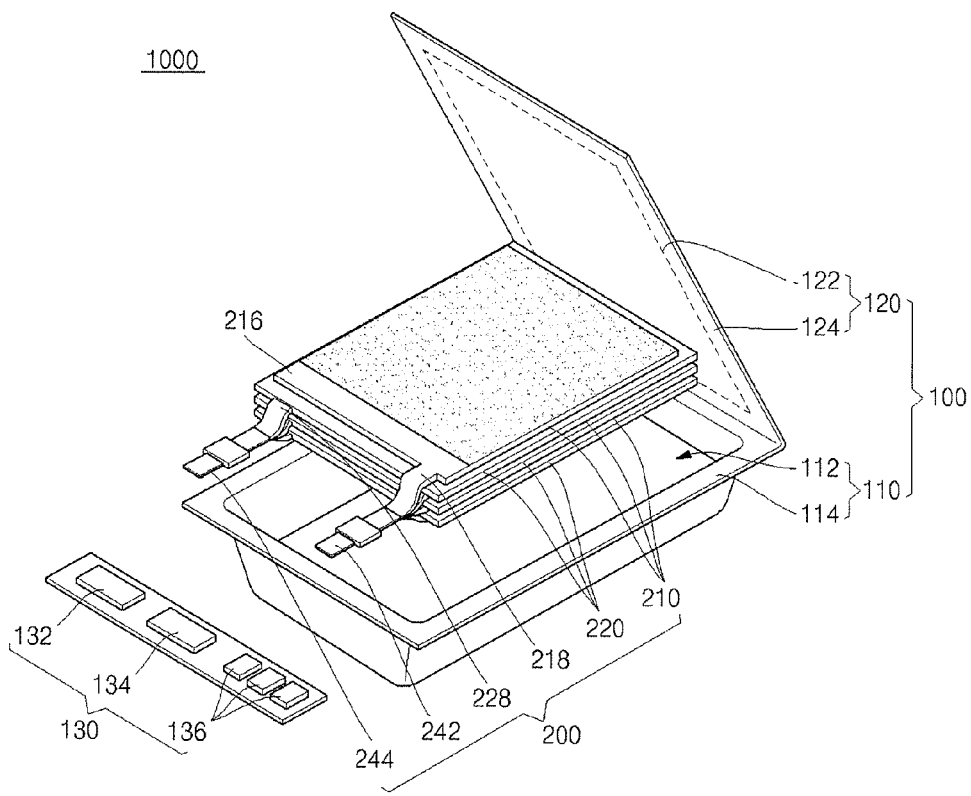
FIG. 1 is a perspective view of a secondary battery according to an embodiment of the present invention.
Figure 2A:
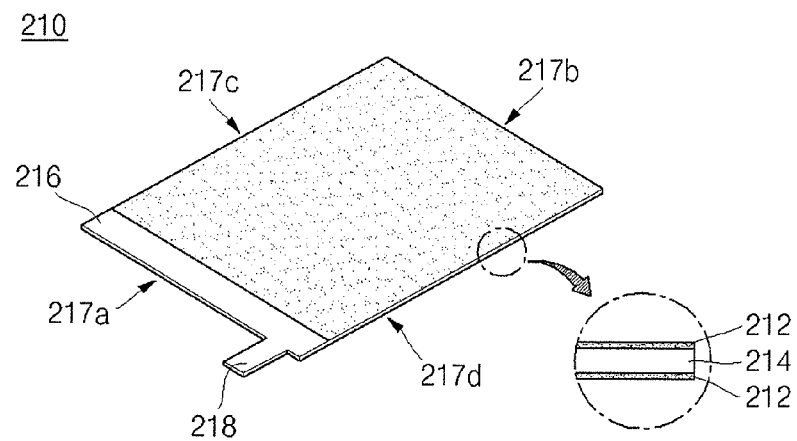
FIGS. 2A and 2B illustrate a first electrode and a second electrode, respectively, of an electrode assembly of the secondary battery shown in FIG. 1.
Figure 2B:
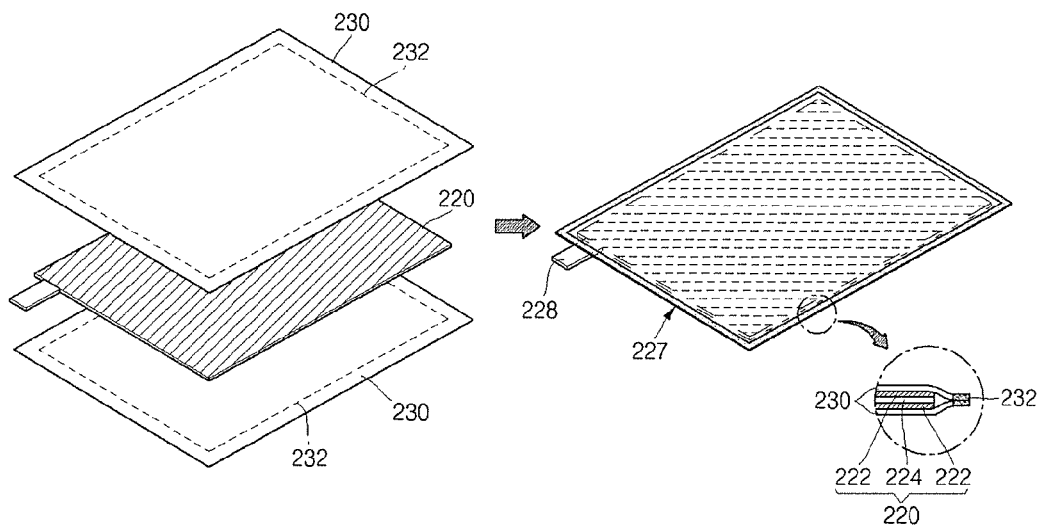

FIG. 1 is a perspective view of a secondary battery according to an embodiment of the present invention, and FIGS. 2A and 2B illustrate a first electrode and a second electrode, respectively, of an electrode assembly of the secondary battery shown in FIG. 1.

Referring to FIGS. 1 to 2B, the secondary battery 1000 includes an outer case 100 and an electrode assembly 200 accommodated in the outer case 100. In one embodiment, the secondary battery 1000 is of a pouch type and the outer case 100 includes a main body 110 and a cover 120. The main body 110 includes a cavity part 112 in which the electrode assembly 200 is accommodated, and a sealing part 114 that extends outwardly from the cavity part 112.

In one embodiment, the cover 120 extends from one edge of the sealing part 114 of the main body 110. The cover 120 completely covers the cavity part 112 of the main body 110 and is sealed to the sealing part 114 of the main body 110, providing for a cavity part cover area 122 and a sealing part 124, which correspond to the cavity part 112 and the sealing part 114 in the main body 110, respectively.

The secondary battery 1000 according to the illustrated embodiment of the present invention can be provided by accommodating the electrode assembly 200 in the cavity part 112 of the main body 110 and then putting on the cover 120 to contact the main body 110. The sealing part 114 of the main body 110 and the sealing part 124 of the cover 120 may be sealed together by, for example, thermal fusion or ultrasonic fusion.

When the electrode assembly 200 is accommodated in the cavity part 112, an electrolyte is injected into the cavity part 112 for impregnating the electrode assembly 200. Alternatively or additionally, the secondary battery 1000 may also include, once the electrode assembly 200 is accommodated and the outer case 100 is sealed, a first electrode lead 242 and a second electrode lead 244 extending from the electrode assembly 200 and being exposed to the outside. The first electrode lead 242 and the second electrode lead 244 are electrically connected to a protection circuit module (PCM) module 130.

The PCM module 130 controls charge and discharge of the electrode assembly 200 and operations of the secondary battery 1000. In one embodiment, the PCM module 130 includes a control element 132, such as an IC element, a secondary protective element 134 for preventing over-current from flowing in the secondary battery 1000, and external terminals 136 connecting the secondary battery 1000 with external devices.

The electrode assembly 200 includes a first electrode plate 210, a second electrode plate 220, and a separator 230. The electrode assembly 200 is configured such that the first electrode plate 210 and the second electrode plate 220 are insulated from each other by the separator 230 located therebetween. Alternatively, the electrode assembly 200 may be formed in a stack-type structure in which the first electrode plate 210, the separator 230, the second electrode plate 220, and the separator 230 are stacked together.

In one embodiment, the first electrode plate 210 is a positive electrode, and the second electrode plate 220 is a negative electrode.

The first electrode plate 210 includes a first electrode collector 214 provided with a first electrode coated portion 212 on at least one surface thereof. Although FIG. 2A illustrates that the first electrode coated portion 212 is provided on both front and rear surfaces of the first electrode collector 214, the first electrode coated portion 212 may be provided only on one surface of the first electrode collector 214. That is, if the first electrode plate 210 is provided at the outermost layer of the electrode assembly 200 formed in the stack-type structure, the first electrode coated portion 212 may not be necessarily formed on the surface of the first electrode plate 210 facing away from the second electrode plate 220.

Here, the first electrode coated portion 212 is not provided on the entire surface of the first electrode collector 214. That is, as shown in FIG. 2A, an uncoated portion not coated with a coating material is formed on a surface of the first electrode collector 214.

In one embodiment, the first electrode plate 210 is substantially rectangular and has four edges. In FIG. 2A, for brevity of explanation, an edge indicated by reference numeral 217a denotes an upper edge, a edge indicated by reference numeral 217b, which is opposite to the upper edge 217a, denotes a lower edge, and two edges indicated by reference numerals 217c and 217d, which are adjacent to the upper edge 217a and the lower edge 217b, respectively, denote neighbor or side edges.

The first electrode plate 210 has a uncoated portion formed in a circumference or perimeter 216 of the upper edge 217a.

The circumference 216 of the upper edge 217a indicates an inward area having a width from the upper edge 217a. The first electrode plate 210 may also have a first electrode tab 218 provided in the upper edge 217a.

The second electrode plate 220 includes a second electrode collector 224 having a second electrode coated portion 222 provided on at least one surface thereof. Although FIG. 2B illustrates that the second electrode coated portion 222 is provided on both front and rear surfaces of the second electrode collector 224, the second electrode coated portion 222 may be on only one surface of the second electrode collector 224, if necessary. That is, if the second electrode plate 220 is provided at the outermost layer of the electrode assembly 200 formed in the stack-type structure, the second electrode coated portion 222 is not necessarily formed on the surface of the second electrode plate 220 facing away from the first electrode plate 210.

The second electrode plate 220 includes a second electrode tab 228 provided on an upper edge 227 corresponding to the upper edge 217a that has been described with reference to FIG. 2B.

The separator 230 is between the first electrode plate 210 and the second electrode plate 220 and insulates the first electrode plate 210 and the second electrode plate 220 from each other. In the illustrated embodiment, as shown in FIG. 2B, two sheets of the separator 230 may be provided to surround the second electrode plate 220. That is to say, the two sheets of the separator 230 are arranged with the second electrode plate 220 therebetween. Then, fusing parts 232 of the two sheets of the separator 230 are fused to each other by, for example, thermal fusion or ultrasonic fusion to surround the second electrode plate 220.

In one embodiment, multiple layers of the first electrode plate 210 and the second electrode plate 220 having two sheets of the separator 230 fused thereto are sequentially stacked, thereby forming the electrode assembly 200. Groups of first electrode tabs 218 and second electrode tabs 228, respectively, are connected together by, for example, welding, riveting or other connection methods, thereby forming the first electrode lead 242 and the second electrode lead 244.

In one embodiment, the first electrode plate 210 is aligned with the second electrode plate 220 to have the maximum surface area such that the first electrode coated portion 212 faces the second electrode coated portion 222 in an area as large as possible.

Since the first electrode plate 210 and the second electrode plate 220 have substantially the same surface area, it is possible to achieve easy alignment of the first electrode plate 210 and the second electrode plate 220. Although FIG. 1 shows that the second electrode plate 220 may appear to be larger than the first electrode plate 210 because it appears to extend past an edge of the first electrode plate, it will be understood that rather than the second electrode plate 220 itself being larger than the first electrode plate 210, it is actually the fusing part 232 (FIG. 2B) of the separator 230, which surrounds the second electrode plate 220, that extends past the first electrode plate. That is, multiple layers of the first electrode plate 210 and the second electrode plate 220 having two sheets of the separator 230 fused thereto are sequentially stacked, and the first electrode plate 210 and the second electrode plate 220 are aligned with respect to at least one of four edges 217a, 217b, 217c, and 217d of the first electrode plate 210, thereby achieving easy alignment of the first electrode plate 210 and the second electrode plate 220.

The phrase "the first electrode plate 210 and the second electrode plate 220 have the same maximum surface area" used herein is intended to precisely mean that a first electrode collector 214 of the first electrode plate 210 and a second electrode collector 224 of the second electrode plate 220 may have substantially the same surface area. In addition, the first electrode collector 214 of the first electrode plate 210 and the second electrode collector 224 of the second electrode plate 220 may have generally the same shape.

Here, since the fusing parts 232 of the separators 230 extending from the second electrode plates 220 are made of polymeric materials, such as polyethylene (PE) or polypropylene (PP), alignment of the first electrode plates 210 and the second electrode plates 220 is not significantly affected.

Figure 3:
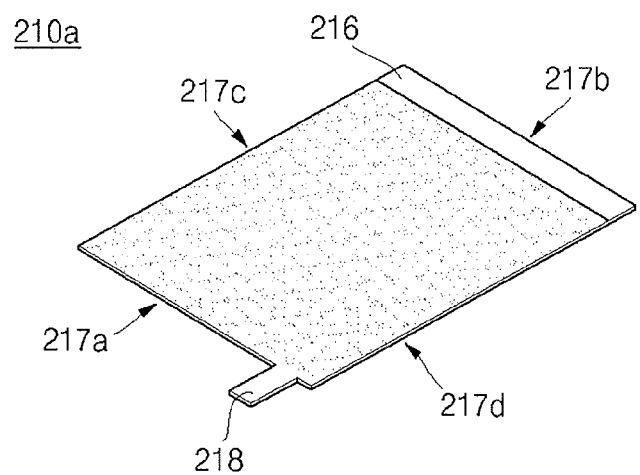
FIG. 3 illustrates a first electrode of an electrode assembly of a secondary battery according to another embodiment of the present invention.

FIG. 3 illustrates a first electrode forming an electrode assembly of a secondary battery according to another embodiment of the present invention.

Referring to FIG. 3, the secondary battery according to the current embodiment of the present invention is substantially the same as the secondary battery 1000 according to the previous embodiment, except for a first electrode 210a corresponding to the first electrode 210 described in FIGS. 1, 2A and 2B. Therefore, the following description will be given with special reference to only a first electrode 210a and thus the detailed description of the other components will be omitted.

As shown in FIG. 3, the first electrode 210a of the secondary battery is different from that of the secondary battery according to the previous embodiment in view a location of the uncoated portion. That is, the uncoated portion is provided at a circumference or perimeter 216 of the lower edge 217b. The circumference 216 of the lower edge 217b indicates an inward area having a predetermined width from the lower edge 217b and as shown, the uncoated portion 216 extends along the lower edge 217b.

Figure 4:
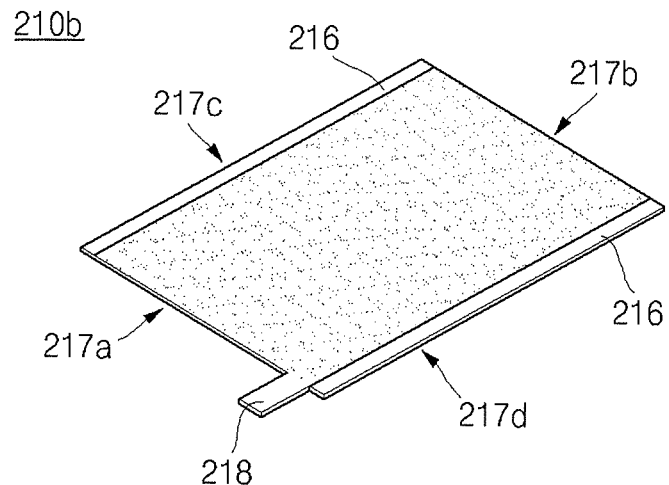
FIG. 4 illustrates a first electrode of an electrode assembly of a secondary battery according to still another embodiment of the present invention.

FIG. 4 illustrates a first electrode forming an electrode assembly of a secondary battery according to still another embodiment of the present invention.

Referring to FIG. 4, the secondary battery according to the current embodiment of the present invention is substantially the same as the secondary battery 1000 according to the previous embodiment, except for a first electrode 210b corresponding to the first electrode 210 described in FIGS. 1, 2A and 2B. Therefore, the following description will be given with special reference to only the first electrode 210b shown in FIG. 4 and thus the detailed description of the other components will be omitted.

As shown in FIG. 4, the first electrode 210 of the secondary battery is different from that of the secondary battery according to the previous embodiment in view of position of the uncoated portion. That is, uncoated portions are provided at one or more circumferences or perimeters 216 of two neighboring edges 217c and 217d. Although FIG. 4 illustrates that the uncoated portions are provided at the circumferences 216 of the two neighboring edges 217c and 217d, the uncoated portions may also be provided at only one of the neighboring edges 217c and 217d. The uncoated portions indicate inward areas each having a predetermined width from the two neighboring edges 217c and 217d.

Figure 5A:
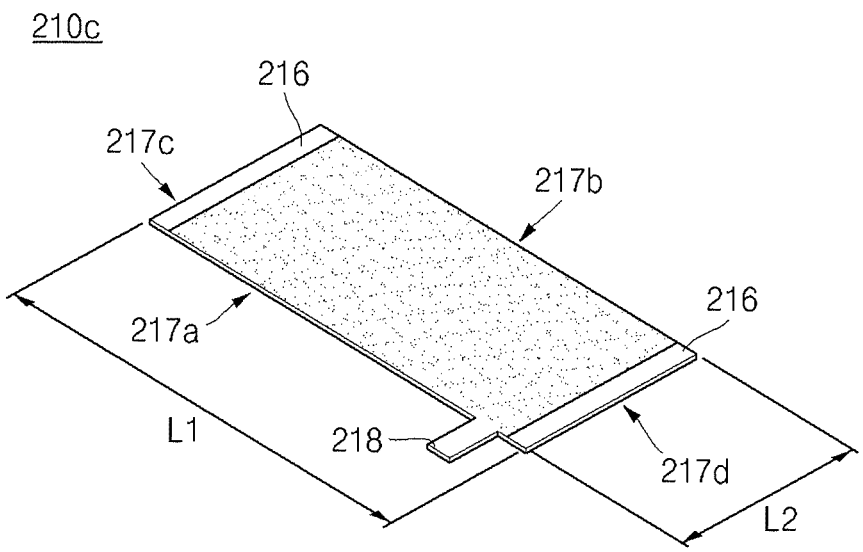
FIGS. 5A and 5B illustrate a first electrode and a second electrode, respectively, of an electrode assembly of a secondary battery according to yet another embodiment of the present invention.
Figure 5B:
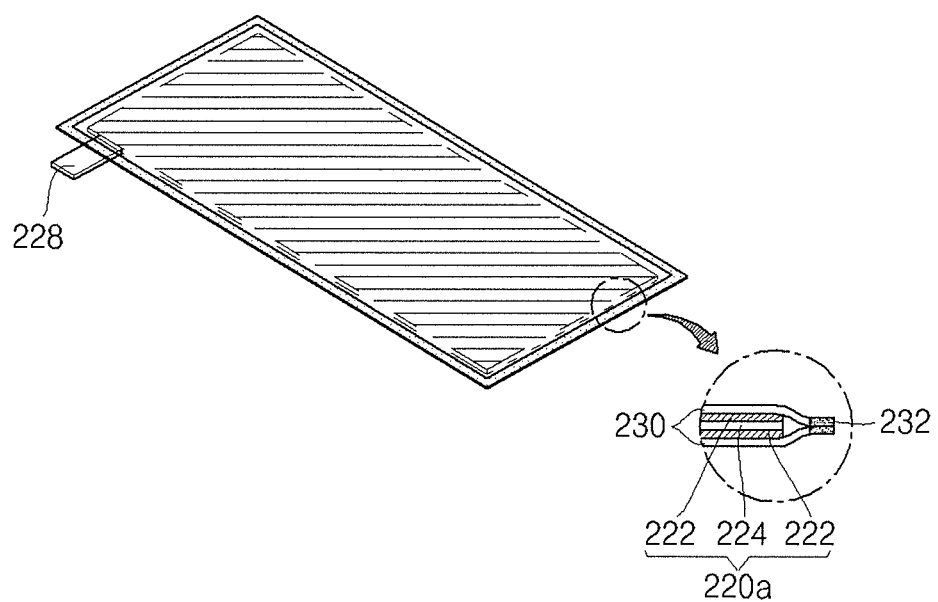

FIGS. 5A and 5B illustrate a first electrode and a second electrode, respectively, forming an electrode assembly of a secondary battery according to yet another embodiment of the present invention.

Referring to FIGS. 5A and 5B, the secondary battery according to the current embodiment of the present invention is substantially the same as the first electrode 210 and the second electrode 220 of the secondary battery 1000 according to the previous embodiment, except for a first electrode 210c corresponding to the first electrode 210 described in FIGS. 1, 2A and 2B.

As shown in FIG. 5A, the first electrode 210c of the secondary battery according to the current embodiment of the present invention is different from that of the secondary battery 1000 according to the previous embodiment in view of position and shape of the uncoated portion. That is, the uncoated portion is provided at one or more circumferences or perimeters 216 of two neighboring edges 217c and 217d. Although FIG. 5A illustrates that the uncoated portions are provided at the circumferences 216 of the two neighboring edges 217c and 217d, the uncoated portions may also be provided at only one of the neighboring edges 217c and 217d. The uncoated portions indicate inward areas each having a predetermined width from the two neighboring edges 217c and 217d.

In addition, the first electrode 210c is configured to have a length L1 of the upper edge 217a or the lower edge 217b greater than a length L2 of each of the neighbor edges 217c and 217d.

Further, the second electrode 220a is transformed to have substantially the same shape as the first electrode 210c, so that the first electrode 210c and the second electrode 220a have substantially the same area.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A secondary battery comprising:
    a case comprising a body having a cavity and a cover sealed to the body; and
    an electrode assembly in the cavity, the electrode assembly comprising:
        a first electrode plate comprising a first electrode collector having a coated portion coated with a first active material and an uncoated portion not coated with the first active material;
        a second electrode plate comprising a second electrode collector having a coated portion coated with a second active material; and
        a separator between the first electrode plate and the second electrode plate,
    wherein the first electrode plate, the second electrode plate and the separator are stacked together,
    wherein the first electrode collector and the second electrode collector have substantially the same surface area,
    wherein the surface area of the coated portion of the second electrode plate is larger than the surface area of the coated portion of the first electrode plate, and
    wherein the first electrode plate is a positive electrode plate and the second electrode plate is a negative electrode plate.

2. The secondary battery of claim 1, wherein the uncoated portion is located generally along at least one edge of the first electrode plate.

3. The secondary battery of claim 2, wherein the first electrode plate has a first electrode tab extending from a first edge of the at least one edge and the second electrode plate has a second electrode tab extending from an edge.

4. The secondary battery of claim 3, wherein the uncoated portion is located along the first edge and along a second edge of the at least one edge of the first electrode plate.

5. The secondary battery of claim 3, wherein the uncoated portion is located along a third edge and a fourth edge of the at least one edge that extend in a direction substantially perpendicular to the first edge.

6. The secondary battery of claim 5, wherein a length of any of the third edge and the fourth edge is less than a length of the first edge.

7. The secondary battery of claim 1, wherein the separator has a larger surface area than any of a surface area of the first electrode plate and a surface area of the second electrode plate.

8. The secondary battery of claim 1, wherein the separator comprises a first sheet and a second sheet fused together to enclose the second electrode plate.

9. The secondary battery of claim 1, wherein the electrode assembly further comprises a plurality of first electrode plates, a plurality of second electrode plates and a plurality of separators, one of the separators being between a respective one of the first electrode plates and a respective one of the second electrode plates.

10. The secondary battery of claim 9, wherein each of the first electrode plates has a first electrode tab extending from a first edge and each of the second electrode plates has a second electrode tab extending from an edge.

11. The secondary battery of claim 10, wherein the first electrode tab of one of the plurality of first electrode plates is electrically coupled to the first electrode tab of at least one other one of the first electrode plates and the second electrode tab of one of the plurality of second electrode plates is electrically coupled to the second electrode tab of at least one other one of the second electrode plates.

12. The secondary battery of claim 11, wherein the first electrode tabs are electrically connected to a first electrode lead and the second electrode tabs are electrically connected to a second electrode lead.

13. The secondary battery of claim 9, wherein the first electrode plates, the second electrode plates and the separators are stacked together.

* * * * *